United States Patent [19]
Dahl

[11] 3,893,552
[45] July 8, 1975

[54] CLUTCH AND BRAKE WITH INTERLOCK VALVES

[75] Inventor: Eugene L. Dahl, Minneapolis, Minn.

[73] Assignee: Horton Manufacturing Co., Minneapolis, Minn.

[22] Filed: Oct. 5, 1973

[21] Appl. No.: 403,803

[52] U.S. Cl.................... 192/12 C; 91/413; 60/420
[51] Int. Cl. ........................................... F16d 67/04
[58] Field of Search.......... 192/87.13, 87.18, 87.19, 192/.098, 3.26, 3.27, 12 C, 18 A

[56] References Cited
UNITED STATES PATENTS

| | | | |
|---|---|---|---|
| 2,286,873 | 6/1942 | Schwartz | 192/87.19 |
| 2,464,986 | 3/1949 | Miller | 192/.098 X |
| 2,580,367 | 12/1951 | Stevens | 192/.098 |
| 2,591,201 | 4/1952 | Rowand | 192/87.13 X |
| 2,772,759 | 12/1956 | Hankin | 192/.098 |
| 3,762,518 | 10/1973 | Hilpert | 192/87.13 |

*Primary Examiner*—Benjamin W. Wyche
*Attorney, Agent, or Firm*—Wicks & Nemer

[57] ABSTRACT

A fluid control system for controlling the operation of a mechanism having a mobile part such as a shaft with first and second fluid pressure sensitive devices alternatively acting on said part to produce movement and change of movement of the mobile part, said fluid control system comprising first and second control means acting on first and second fluid pressure sensitive devices respectively to produce change of motion of the mobile part, means for selecting the fluid pressure sensitive device to be actuated and directing fluid under pressure to the control means selected and first and second delay means associated with each control means rendering the control means selected inoperative until the pressure of the fluid in the companion control means has been reduced to a certain value to actuate the selected fluid pressure sensitive device.

1 Claim, 2 Drawing Figures

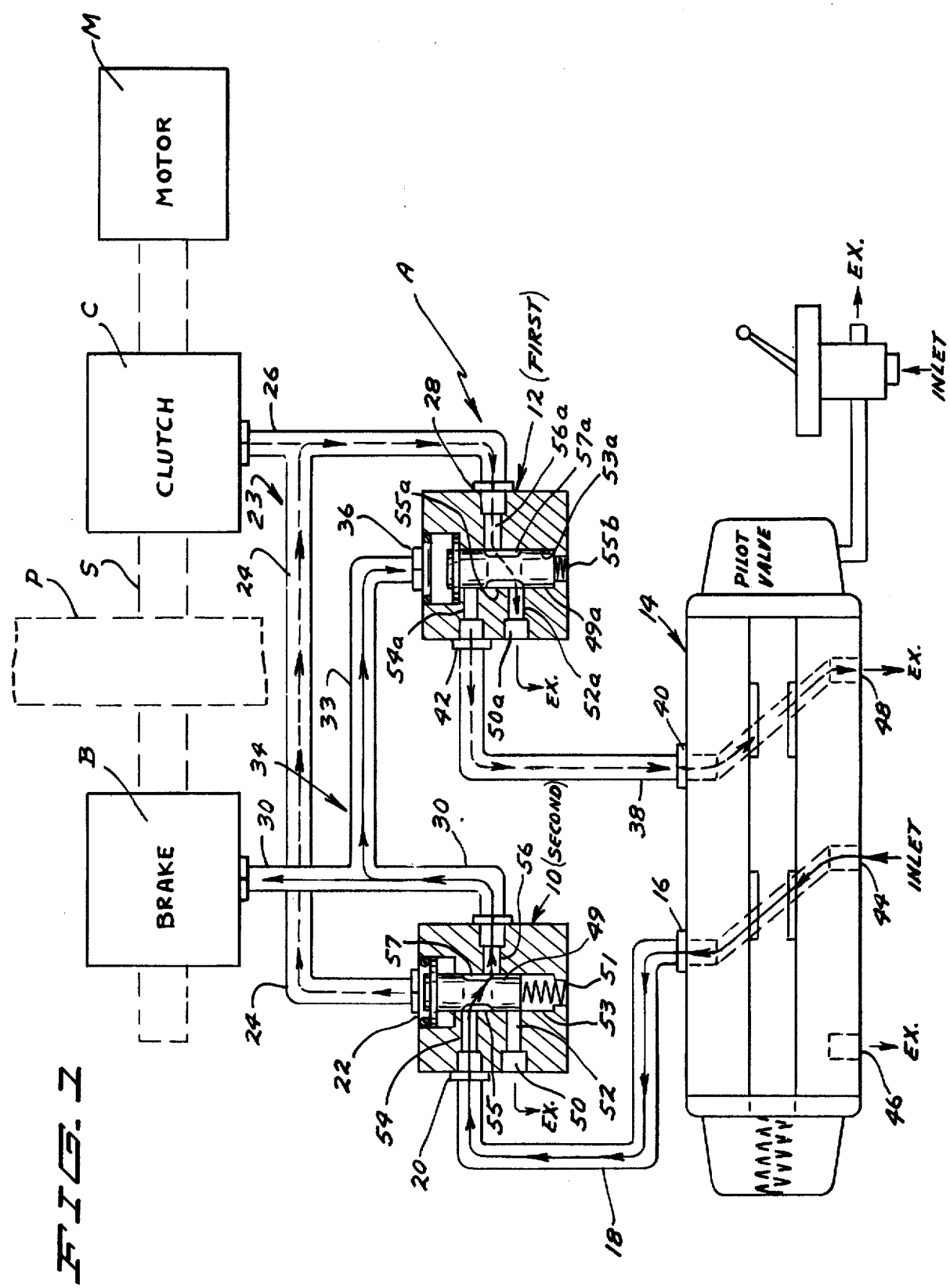

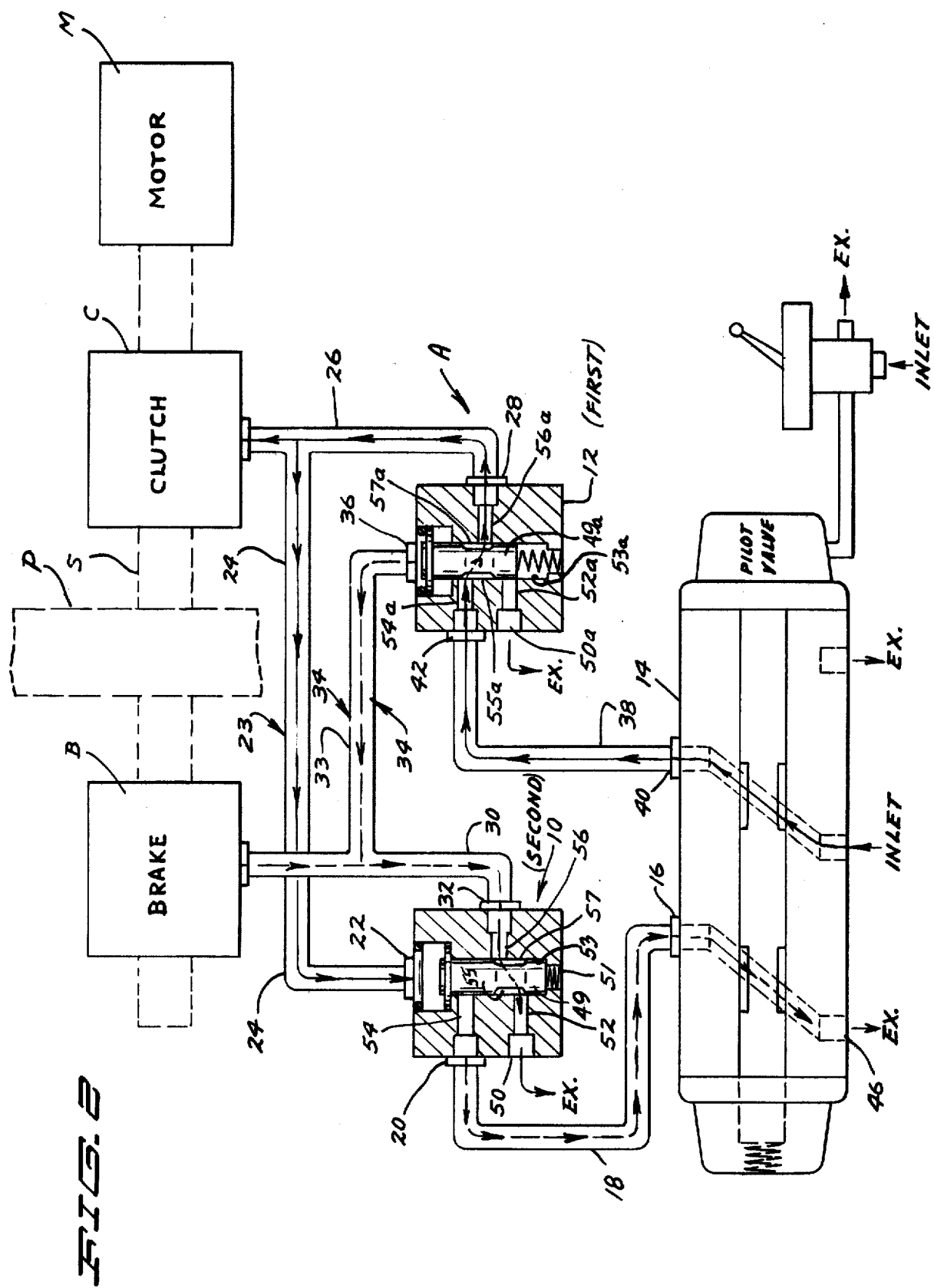

3,893,552

CLUTCH AND BRAKE WITH INTERLOCK VALVES

SUMMARY

The invention relates broadly to fluid operated friction clutches and brakes and the cycling from one to the other and more particularly to a device for limiting the clutch torque rise until the brake torque has decayed almost entirely and conversely for limiting the brake torque rise until the clutch torque has decayed almost entirely.

The torque rise is more rapid than the torque decay and there is a residual of the braking action at a time when the clutch is coming on and vice versa.

In clutch-brake cycles there is a tendency for the clutch torque to rise to a sizeable and undesirable level before the brake torque has decayed entirely which situation has been referred to as "overlap". As a result of "overlap" undesirable heat is built up particularly where there is a fast cycle from clutch to brake or brake to clutch. It is this condition that the subject device remedies. The device is also applicable to a cycle from a slow speed clutch to a high speed clutch and vice versa.

In the drawings forming part of this application:

FIG. 1 is a schematic drawing of a fluid control system for limiting clutch-brake torque overlap in brake "on" and clutch exhaust condition, the brake and clutch illustrated as attached to a shaft having a roll of paper to be cycled in rotation by a clutch actuated by a motor.

FIG. 2 is a drawing similar to FIG. 1 in clutch on and brake exhaust condition.

Referring to the drawings in detail, the device A includes a first control means in one form in the conventional poppet valve 12, a second companion control means in the identical conventional poppet valve 10 and a selecting means in one form in the conventional four-way spool valve 14. Fluid pressure sensitive devices are illustrated in the conventional fluid operated friction brake B and clutch C. The poppet valves 10 and 12 are set to be actuated by pressure over 20 p.s.i. for the given situation illustrated and described.

Manually operated selecting means is provided in a preferred form shown as valve 14 having a first port 16 to which the fluid conducting line 18 is connected at one end with the other end connected to the port 20 of the poppet valve 10. The valve 10 also includes the port 22 to which is connected the fluid conducting line 24 with the other end of the line 24 connected to the line 26, the line 26 connected at one end to the clutch C. The other end of the line 26 is connected at port 28 of the poppet valve 12. Further provided is the line 30 connected at one end to the port 32 of the valve 10 and at the other end to the brake B. A first delay means 34 includes the diversionary line 33, one end of which is connected to the line 30 and the other end to the port 36 of the valve 12. A second delay means 23 includes the diversionary line 24 which is connected at one end to the line 26 and at the other end to the port 22 of valve 10.

The numeral 38 designates a line which at one end is connected to the port 40 of the four way spool valve 14 with the other end connected to the port 42 of the valve 12, the four way valve 14 also includes the fluid inlet port 44 and the exhaust ports 46 and 48.

The valve 10 is also formed with the exhaust port 50 and internal line 52 communicating with cylinder 53 in which the piston 49 reciprocates. The piston 49 is formed with the passages 55 and 57, and connected to the port 20 is the internal line 54 communicating with the cylinder 53. Connected to the port 32 and cylinder 53 of the valve 10 is the internal communicating line 56. The internal lines of valve 12 and constructions thereof which are identical to those of valve 10 have the same reference numeral but accompanied by a lower case letter *a*.

In the illustration of FIG. 1 the brake B is shown as operative with the clutch deactivated while in FIG. 2 the clutch C is shown as operative with the brake deactivated. The elimination of the overlap in cycling from a brake operation to a clutch operation and vice versa is as follows.

In FIG. 1 fluid pressure is being directed from the four-way valve 14 via line 18 through port 20 and line 54 through the passages 55 and 57 of poppet valve 10 and line 30 to the brake B shown by solid arrows thereby pressurizing the brake. Some of the fluid pressure is diverted to the first diversionary or delay line 33 to the top of the second poppet valve 12 holding it down upon its spring 55b as in FIG. 1 where the valve 12 allows exhausting from the clutch C through line 26, port 28, line 56a, passage 57a, passage 55a, line 52a and out through exhaust port 50a as shown in broken arrows, FIG. 1.

While the fluid pressure in first diversionary delay line 33 remains over 20 p.s.i., the first control valve 12 is held in the position of FIG. 1 against the urging of spring 55b. When the valve 14 is moved from the position of FIG. 1 to that of FIG. 2 to deactivate the brake and activate the clutch, fluid pressure is directed via line 38 through port 42, line 54a, passageway 55a, passageway 57a, out line 56a and port 28 and through line 26 to the clutch C thereby pressurizing the same. Some of the fluid pressure is diverted through the second diversionary delay line 24 to the top of the first poppet valve 10 holding it down upon its spring 51 as in FIG. 2 where the valve 10 allows exhausting from the brake B through line 30, port 32, lines 56 and passage 57, passage 55, line 52 and out through port 50 as shown in broken arrows, (FIG. 2).

Thus, it will be seen that when going from braking of the shaft S to clutching, fluid pressure cannot reach the clutch C until the pressure in line 33 goes below 20 p.s.i. and at that time pressure can reach the clutch through poppet 12, as described. This is due to the fact that the poppet 12 is in the position of FIG. 1 upon the spring 55 until the pressure in line 33 falls below 20 p.s.i. at that point, the valve 12 moves from the position of FIG. 1 to that of FIG. 2 whereby the line 23 is pressurized and also clutch C as set forth above and illustrated in FIG. 2. With line 26 pressurized some of the pressure is diverted to the second diversionary or delay line 26 to the top of the first poppet valve 10 holding it down upon its spring 51 as in FIG. 2 where the valve 10 allows exhausting from the brake B through line 30, port 32, line 56a, passage 57a, passage 55a and line 52a and out through port 50a as shown in broken arrows in FIG. 2. At the same time and with the valve 10 in the position of FIG. 2 the brake B is exhausting through the poppet valve 10 as shown in the position shown in FIG. 2. Thus to put it succinctly, with the above described device there is a delay on the come-on of the clutch so the brake can get out of the way and a delay on the come-on of the brake so the clutch can get out of the way.

Put another way, the change from braking to clutching, FIG. 1 to FIG. 2, the valve 14 is moved to pressurize line 26 but such cannot be done through valve 12 until the pressure in diversion line 33 and also line 30 falls below 20 p.s.i. When the pressure in lines 30 and 33 is below 20 p.s.i. there is enough decay in the brake torque and the poppet valve 12 then allows flow therethrough to pressurize the clutch. In changing from clutching to braking, the brake is prevented from starting to engage until the line 24 has exhausted to less than 20 p.s.i.

When valve 14 shifts to energize clutch C at that time it is blocked at valve 12 until the brake is exhausted to 20 p.s.i. but the exhausting process is taking place through 46 of 14 via 30, 56, 57, 55 and 18 for that brief period of time until the brake has exhausted to less than 20 p.s.i. after which valve 12 opens and builds up to 20 p.s.i. at which time valve 10 then shifts to block 54 and at that time further exhausting of the brake is through 50a.

Further, a point in time must be considered when the brake has exhausted to below 20 p.s.i. and the poppet 12 is just about to open. It now then takes about the same amount of time for the brake to exhaust to 7 p.s.i. as it does for the clutch pressure to build up to 7 p.s.i. to engage, it will be seen that the clutch and brake units "miss" each other and virtually no energy-wasting overlap is produced.

When the valve 14 shifts back again to the position shown in FIG. 1, the entire process is repeated, the only exception being that then the brake is prevented from starting to engage until the clutch has exhausted to 20 p.s.i.

The drawings illustrate the clutch C and brake B for cycling the roll of paper P on the shaft S.

I claim:

1. A fluid control system for controlling the operation of a mechanism, comprising in combination:
    a. a mobile part;
    b. a motor driving the mobile part;
    c. a fluid sensitive, operated brake operatively interconnected to the mobile part having a fluid pressure sensor port;
    d. a fluid sensitive, operated clutch operatively interconnected to the mobile part having a fluid pressure sensor port;
    e. a first delay member including a piston having a first position and second position, a first port, a second port, a third port, and an exhaust port, and means for biasing the piston to the first position, the first position of the piston communicating the first port with the third port and the second position of the piston communicating the third port with the exhaust port, and the second port directly communicating with the piston such that when fluid is supplied under pressure to the second port, the piston will move from the first position to the second position;
    f. a second delay member including a piston having a first position and second position, a first port, a second port, a third port, and an exhaust port, and means for biasing the piston to the first position, the first position of the piston communicating the first port with the third port and the second position of the piston communicating the third port with the exhaust port, and the second port directly communicating with the piston such that when fluid is supplied under pressure to the second port, the piston will move from the first position to the second position;
    g. a fluid line connecting the third port of the first delay member to the fluid pressure sensor port of the clutch and to the second port of the second delay member;
    h. a fluid line connecting the third port of the second delay member to the fluid pressure sensor port of the brake and to the second port of the first delay member;
    i. a spool valve having a first position and a second position including a first port, second port, a third port, a fourth port, and a fifth port, the first position communicating the fourth port with the first port and communicating the second port with the fifth port, and the second position communicating the first port with the third port and communicating the fourth port with the second port;
    j. a fluid line connecting the first port of the spool valve with the first port of the second delay member;
    k. a fluid line connecting the second port of the spool valve with the first port of the first delay member;
    l. means for supplying pressurized fluid to the fourth port of the spool valve; and
    m. means for allowing the exhausting of fluid from the third port and the fifth port of the spool valve, the exhaust port of the first delay member, and the exhaust port of the second delay member whereby when the spool valve is in the first position, fluid under pressure is supplied through the second delay member to the fluid pressure sensor port of the brake and to the second port of the first delay member and simultaneously the second port of the second delay member and the fluid sensor port of the clutch communicate through the first delay member to the exhaust means and when the spool valve is in the second position, fluid under pressure is supplied through the first delay member to the fluid pressure sensor port of the clutch and to the second port of the second delay member and simultaneously the second port of the first delay member and the fluid pressure sensor port of the brake communicate through the second delay member to the exhaust means thus preventing overlap in clutch-brake cycles where there is a fast cycle from clutch to brake or brake to clutch.

* * * * *